US011008006B2

(12) United States Patent
Natsumi et al.

(10) Patent No.: US 11,008,006 B2
(45) Date of Patent: May 18, 2021

(54) DRIVING ASSIST SYSTEM AND DRIVING ASSIST METHOD

(71) Applicant: ISUZU MOTORS LIMITED, Tokyo (JP)

(72) Inventors: Kouki Natsumi, Isehara (JP); Masaichi Takahashi, Yokohama (JP); Shinichi Ishiguro, Kawasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 122 days.

(21) Appl. No.: 16/349,933

(22) PCT Filed: Nov. 13, 2017

(86) PCT No.: PCT/JP2017/040696
§ 371 (c)(1),
(2) Date: May 14, 2019

(87) PCT Pub. No.: WO2018/088548
PCT Pub. Date: May 17, 2018

(65) Prior Publication Data
US 2019/0337514 A1 Nov. 7, 2019

(30) Foreign Application Priority Data
Nov. 14, 2016 (JP) .............................. JP2016-221683

(51) Int. Cl.
*B60W 30/14* (2006.01)
*B60W 30/12* (2020.01)
(52) U.S. Cl.
CPC .......... *B60W 30/146* (2013.01); *B60W 30/12* (2013.01); *B60W 2554/804* (2020.02)
(58) Field of Classification Search
CPC ............... B60W 30/146; B60W 30/12; B60W 2554/804; B60W 2554/80;
(Continued)

(56) References Cited

U.S. PATENT DOCUMENTS 7,038,614 B1 * 5/2006 Aker .................... G01S 13/583
342/70
8,831,813 B1 * 9/2014 Ferguson .................. B60T 7/22
701/23
(Continued)

FOREIGN PATENT DOCUMENTS

JP 2006-176062 A 7/2006
JP 2008-282275 A 11/2008
(Continued)

OTHER PUBLICATIONS

International Search Report and Written Opinion for related International Application No. PCT/JP2017/040696 dated Dec. 19, 2017; English translation of ISR provided; 10 pages.

*Primary Examiner* — Angelina Shudy
(74) *Attorney, Agent, or Firm* — Procopio, Cory, Hargreaves & Savitch LLP

(57) ABSTRACT

Provided is a driving assist system which includes an own vehicle velocity sensor, an adjacent vehicle velocity sensor, and a control device and where the control device makes constant velocity travelling by causing a velocity of an own vehicle to fall within a constant velocity range between a lower limit value and an upper limit value set based on a target velocity and, when the own vehicle travels on a passing lane and an adjacent vehicle travels on a cruising lane, if a relative velocity of the adjacent vehicle to the own vehicle falls within a set range, the control device performs speed-up adjustment to increase the velocity of the own vehicle in a range up to the upper limit value.

5 Claims, 4 Drawing Sheets

(58) Field of Classification Search
CPC ............ B60W 2552/53; B60W 60/00; B60W 60/001; B60W 60/0025; B60W 30/18163; B60W 30/10; B60W 30/14; B60W 30/143; B60W 30/18; B60W 2520/10; B60W 2555/60; B60W 2520/28; B60K 31/00; B60K 31/0008; B60K 2031/0091; B60K 2031/0033
USPC .......................................................... 701/70
See application file for complete search history.

(56) References Cited

U.S. PATENT DOCUMENTS

| | | | |
|---|---|---|---|
| 9,082,239 B2* | 7/2015 | Ricci | H04L 67/10 |
| 9,120,505 B2* | 9/2015 | Tamura | B62D 15/025 |
| 9,862,272 B2* | 1/2018 | Schuberth | B60W 30/143 |
| 10,286,908 B1* | 5/2019 | Wengreen | B60W 30/0956 |
| 10,538,244 B2* | 1/2020 | Niino | B60W 30/18163 |
| 10,858,007 B2* | 12/2020 | Hashimoto | B60Q 1/346 |
| 2003/0234127 A1* | 12/2003 | Sudou | B60W 30/18145 180/170 |
| 2004/0111209 A1* | 6/2004 | Kagawa | B60K 31/04 701/93 |
| 2005/0004744 A1* | 1/2005 | Dieckmann | B60K 31/0008 701/96 |
| 2016/0347175 A1* | 12/2016 | Yamashita | B60K 31/0008 |
| 2017/0240109 A1* | 8/2017 | Kimura | G01S 13/931 |
| 2017/0248949 A1* | 8/2017 | Moran | G08G 1/165 |
| 2017/0313311 A1 | 11/2017 | Niino et al. | |
| 2017/0363430 A1* | 12/2017 | Al-Dahle | G01C 21/3415 |
| 2018/0046196 A1* | 2/2018 | Hashimoto | B60W 30/18163 |
| 2018/0122244 A1* | 5/2018 | Mueller | B60W 30/0956 |
| 2018/0290650 A1* | 10/2018 | Ryne | B60W 30/09 |
| 2018/0290657 A1* | 10/2018 | Ryne | G06K 9/00818 |
| 2018/0354510 A1* | 12/2018 | Miyata | B60W 50/14 |
| 2019/0143972 A1* | 5/2019 | Ishioka | B60W 30/162 701/70 |
| 2019/0193739 A1* | 6/2019 | Tokimasa | B60K 31/00 |
| 2019/0371167 A1* | 12/2019 | Min | G08G 1/0145 |
| 2020/0180635 A1* | 6/2020 | Hong | B62D 15/024 |
| 2020/0255035 A1* | 8/2020 | Sonntag | B60W 60/0059 |
| 2020/0365015 A1* | 11/2020 | Nguyen | G08G 1/0133 |
| 2020/0377102 A1* | 12/2020 | Kuwahara | B60W 30/18163 |

FOREIGN PATENT DOCUMENTS

| | | | | |
|---|---|---|---|---|
| JP | 2009-301132 A | | 12/2009 | |
| JP | 2016-088504 A | | 5/2016 | |
| JP | 2016-110324 A | | 6/2016 | |
| JP | 2018062263 A | * | 4/2018 | ............ B60W 10/04 |

* cited by examiner

DRIVING ASSIST SYSTEM AND DRIVING ASSIST METHOD

CROSS-REFERENCE TO RELATED APPLICATIONS

This application is a U.S. National Stage entry of PCT Application No: PCT/JP2017/040696 filed on Nov. 13, 2017, which claims priority to Japanese Patent Application No. 2016-221683, filed Nov. 14, 2016, the contents of which are incorporated herein by reference.

TECHNICAL FIELD

The present disclosure relates to a driving assist system and a driving assist method, and more particularly to a driving assist system and a driving assist method for improving fuel efficiency.

BACKGROUND ART

A device has been proposed that the device determines a lane as a recommended travel lane in which a vehicle travels at a velocity close to a set vehicle velocity, among a velocity of a preceding vehicle traveling ahead of an own vehicle on a cruising lane and a velocity of an adjacent vehicle traveling ahead of the own vehicle on an adjacent lane adjacent to the cruising lane (see, for example, Patent Literature 1). This device eliminates the need for a driver to determine a lane by driving the own vehicle to follow either the preceding vehicle or the adjacent vehicle.

CITATION LIST

Patent Literature

[Patent Literature 1]: JP-A-2016-88504

SUMMARY

Technical Problem

In a case of driving an own vehicle at a set target velocity, it is the case of traveling on a road such as an expressway. On expressways or the likes, there are two or more lanes including a cruising lane and a passing lane for overtaking a preceding vehicle traveling on the cruise lane on one side.

On the expressways, a driver accelerates the own vehicle and overtakes other vehicles when a period where the own vehicle travels parallel to other vehicles becomes long and the fuel efficiency is deteriorated by causing unnecessary acceleration when overtaking. Parallel travelling mentioned in this case means that the own vehicle and another vehicle travel side by side in a right-left direction.

In other words, in the above-described device which makes an own vehicle follow either a preceding vehicle or an adjacent vehicle, unnecessary acceleration may occur because the own vehicle overtakes the adjacent vehicle when traveling on an expressway or the like.

The present disclosure provides a driving assist system and a driving assist method which can improve fuel efficiency by reducing unnecessary acceleration and deceleration when traveling on a road having two or more lanes on one side.

Solution to Problem

According to the present disclosure, there is provided a driving assist system which is installed in an own vehicle, supports velocity adjustment of the own vehicle in a time when the own vehicle travels on a road provided with two or more lanes including a cruising lane and a passing lane on one side, and includes a relative velocity acquisition device that acquires a relative velocity of an adjacent vehicle, which travels in the same direction as the own vehicle and is ahead of the own vehicle on a lane adjacent to the lane on which the own vehicle travels, with respect to the own vehicle; and a control device that is connected to the relative velocity acquisition device to adjust the velocity of the own vehicle. The control device makes constant velocity travelling by causing the velocity of the own vehicle to fall within a constant velocity range between a lower limit value and an upper limit value set based on a target velocity, and when the own vehicle travels on the passing lane and the adjacent vehicle travels on the cruising lane, if the relative velocity acquired by the relative velocity acquisition device falls within a set range set in advance, the control device performs speed-up adjustment to increase the velocity of the own vehicle in a range up to the upper limit value.

Further, according to the present disclosure, there is provided a driving assist method which includes, when, on a road provided with two or more lanes including a cruising lane and a passing lane on one side, an own vehicle travels on the passing lane with constant velocity travelling where a velocity of the own vehicle falls within a constant velocity range between a lower limit value and an upper limit value set based on a target velocity and an adjacent vehicle travelling in the same direction as the own vehicle ahead of the own vehicle travels on the cruising lane, acquiring a relative velocity of the adjacent vehicle to the own vehicle, determining whether the acquired relative velocity falls within a set range set in advance, and performing velocity adjustment where the velocity of the own vehicle is increased in a range up to the upper limit value to make the relative velocity more negative when it is determined that the acquired relative velocity falls within the set range.

Advantageous Effects of Invention

According to the present disclosure, when the relative velocity of the adjacent vehicle to the own vehicle falls within the set range, the own vehicle can overtake the adjacent vehicle more quickly by performing the speed-up adjustment which increases the velocity of the own vehicle in the range up to the upper limit value. This shortens the period of time when the own vehicle and the adjacent vehicle travel parallel, which is advantageous for reducing unnecessary acceleration by a driver and can reduce unnecessary fuel consumption. As a result, fuel consumption can be improved.

DESCRIPTION OF EMBODIMENTS

Figure 1:
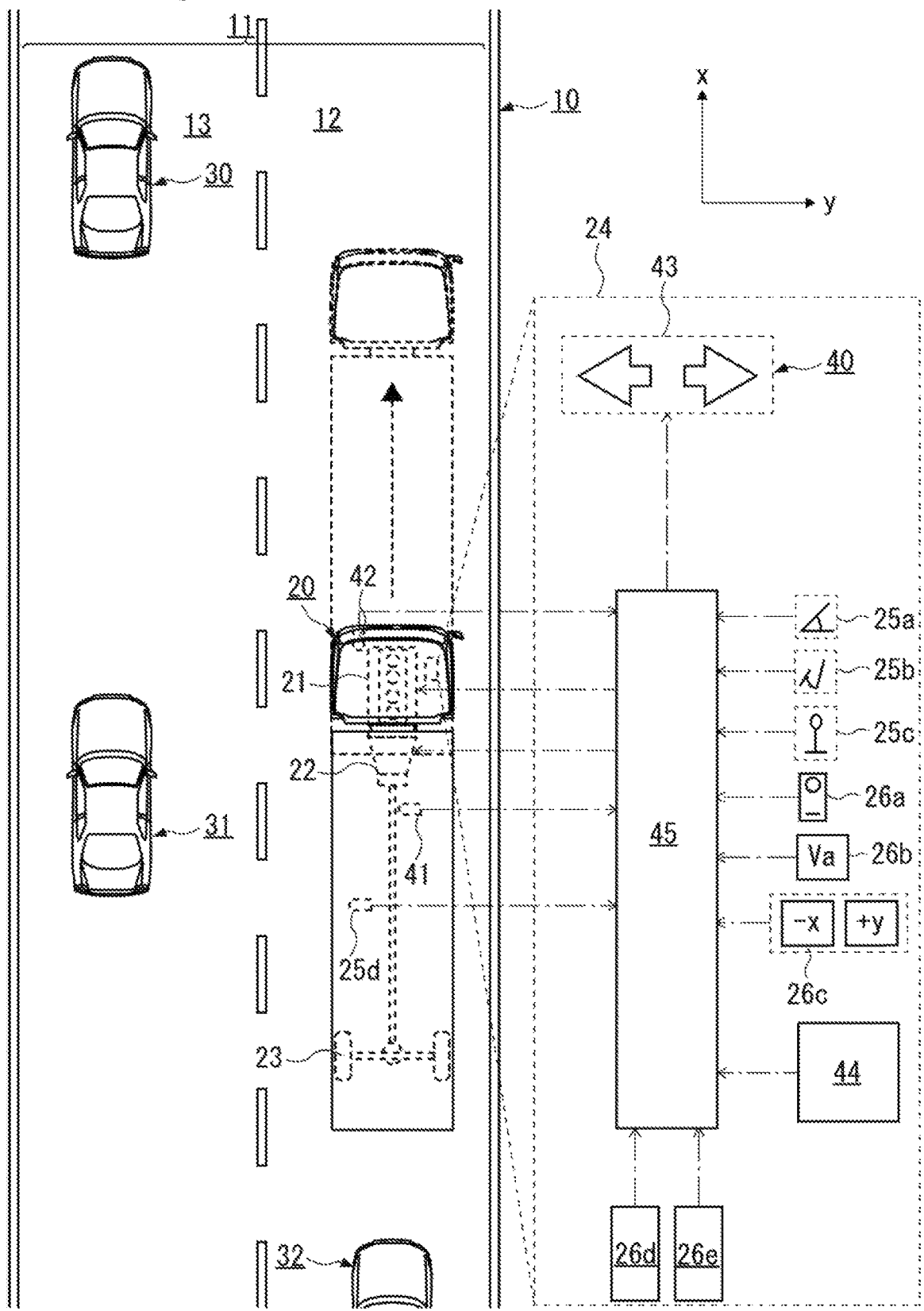
FIG. 1 is a plan view illustrating a state in which an own vehicle equipped with an embodiment of a driving assist system of the present disclosure travels in a passing lane.

Hereinafter, an embodiment of the present disclosure will be described with reference to the drawings. In the drawings, x is a traveling direction (front-rear direction) of a vehicle and y is a lateral side (right-left direction) of the vehicle.

Figure 2:
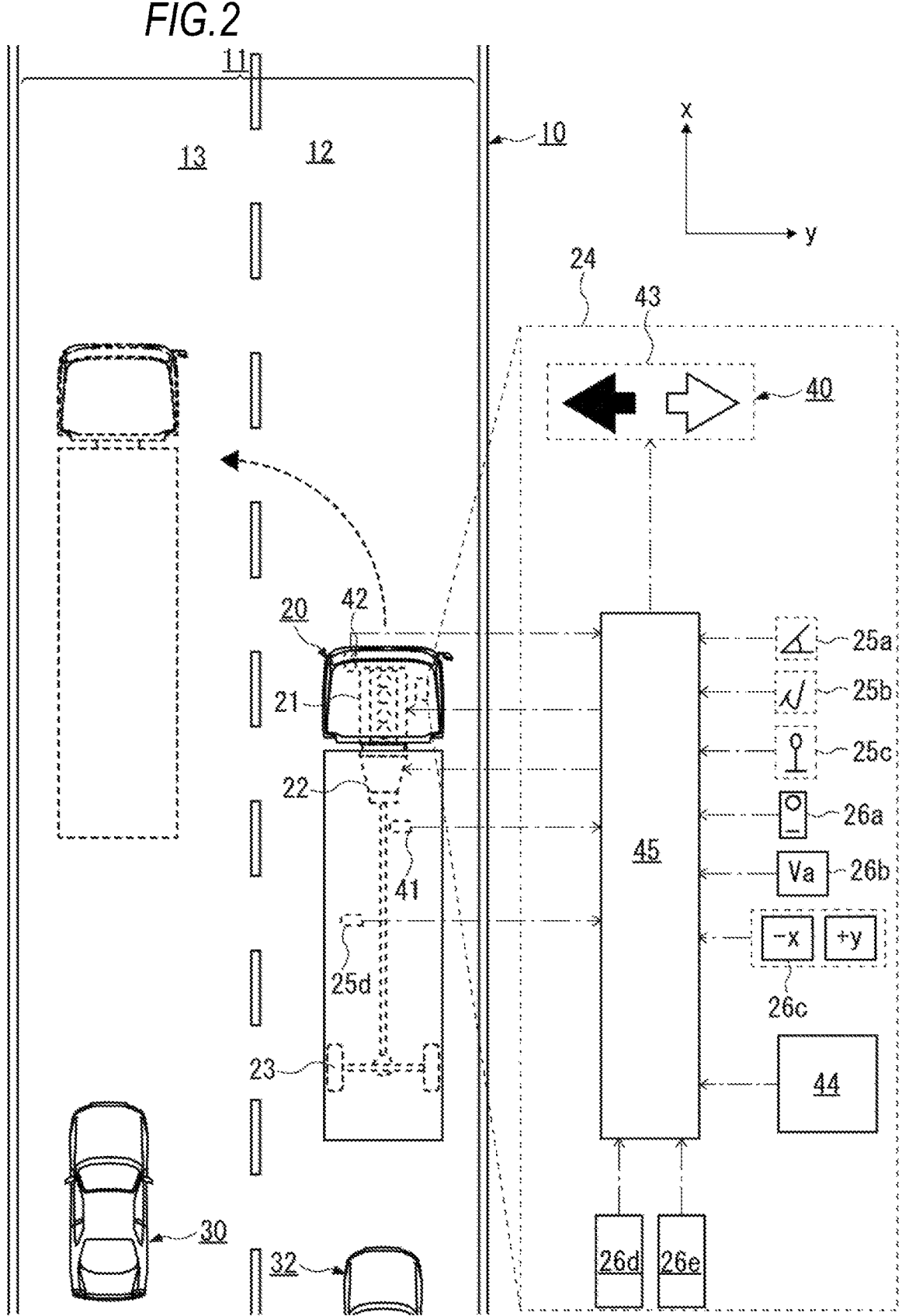
FIG. 2 is a plan view illustrating a state in which the own vehicle equipped with the embodiment of the driving assist system of the present disclosure travels a cruising lane after passing an adjacent vehicle.
Figure 3:
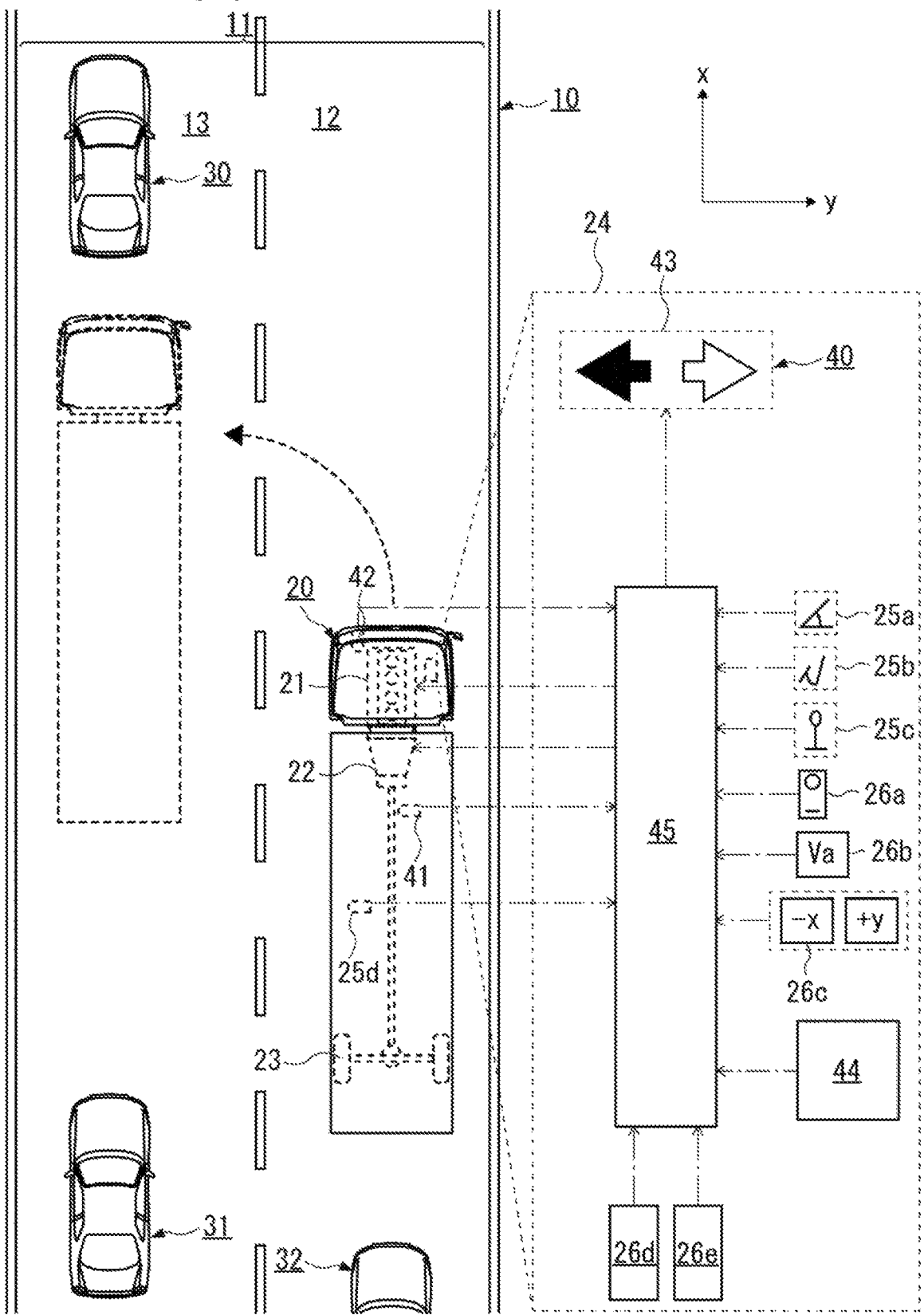
FIG. 3 is a plan view illustrating a state in which the own vehicle equipped with the embodiment of the driving assist system of the present disclosure travels in the traveling lane.
Figure 4:
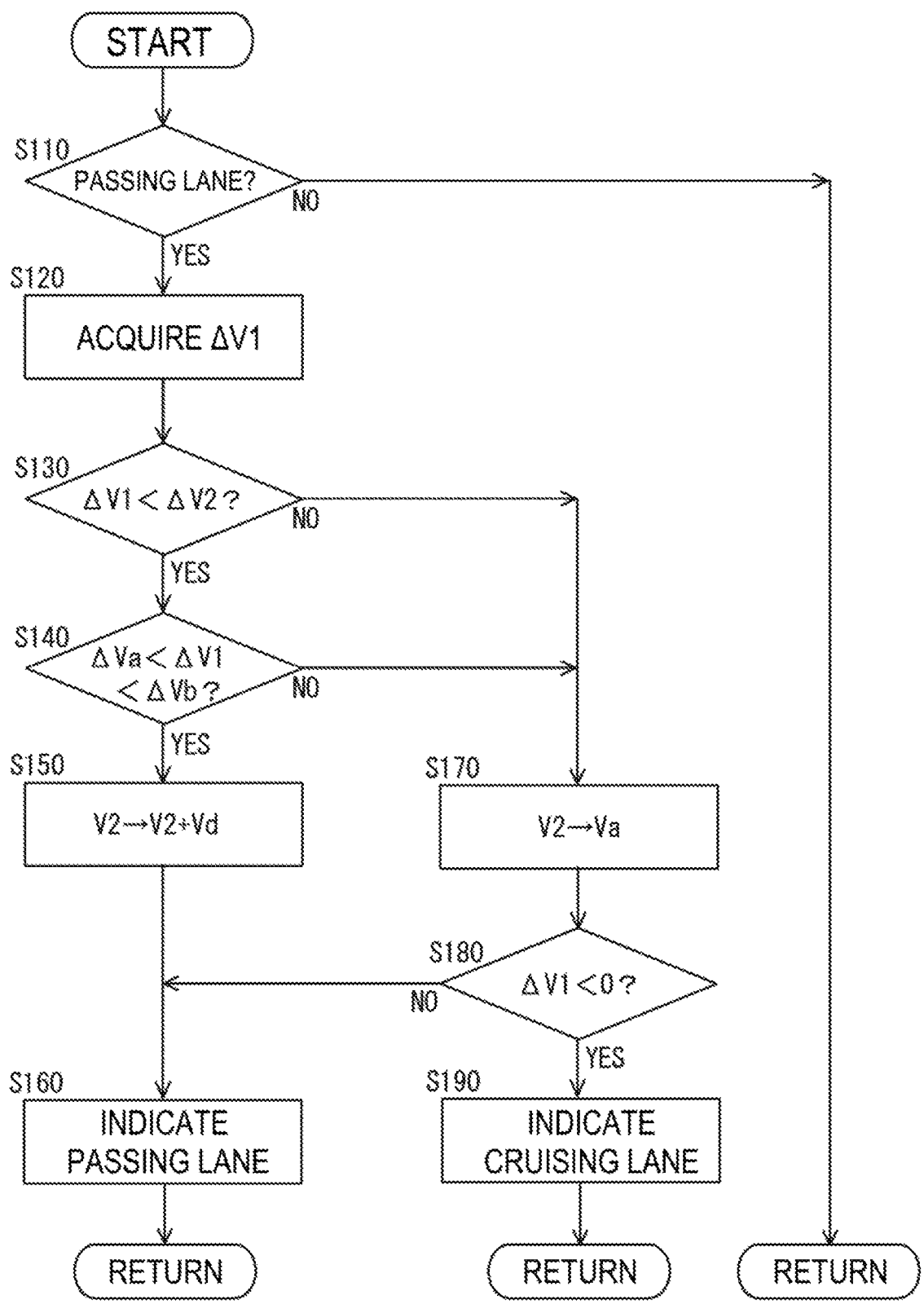
FIG. 4 is a flow diagram illustrating a driving assist method of the present disclosure.

As illustrated in FIGS. 1 to 3, a driving assist system 40 according to the embodiment is a system which supports driving of an own vehicle 20 when, on a road 10, the own vehicle 20 travels at a velocity V2 in a passing lane 12 on one side 11 and an adjacent vehicle 30 travels at a velocity V3 in a cruising lane 13. The driving assist system 40 is configured to include an own vehicle velocity sensor 41, an adjacent vehicle velocity sensor 42, an indication device 43, and a control device 45.

The road 10 is a left-side-travel expressway, and on two lanes of the passing lane 12 and the cruising lane 13 are provided in the one side 11 thereof. The passing lane 12 is a lane adjacent to a central side of the road 10, that is, the right side of the cruising lane 13, and is a lane on which a vehicle can travel when the vehicle passes a leading vehicle traveling on the cruising lane 13. When the road 10 is a right-side-travel expressway, the passing lane 12 is adjacent to the central side of road 10, that is, the left side of the cruising lane.

The own vehicle 20 includes an engine 21, a power transmission 22, a drive wheel 23, and a control system 24. In the own vehicle 20, rotational power generated by the engine 21 is transmitted to the drive wheel 23 via the power transmission 22 such as a clutch, a transmission, a propeller shaft, and a differential gear.

The control system 24 is constituted of the control device 45, various sensors (25a to 25d, 41, and 42), and various devices (26a to 26e) and electrically connected to the engine 21 and the power transmission 22 via signal lines indicated by one-dot chain lines.

The control device 45 is a hardware constituted of a CPU which performs various information processing, an internal storage device which can read and write programs used to perform the various information processing and information processing results, various interfaces, and the likes. The control device 45 controls the engine 21 and the power transmission 22 based on values acquired by the various sensors and values set to the various devices.

As the various sensors, an accelerator opening degree sensor 25a for detecting an accelerator opening degree from a depression amount of an accelerator pedal, a brake opening degree sensor 25b for detecting a brake opening degree as a depression amount of a brake pedal, and a position sensor 25c for detecting a position of a shift lever are installed in a cab. In a chassis, the own vehicle velocity sensor 41 for detecting the velocity of the own vehicle 20 and an acceleration sensor 25d are installed.

As various devices, an operation switch 26a of an automatic cruise mode, a velocity setting switch 26b, a range setting switch 26c, a map information acquisition device 26d, and a vehicle weight acquisition device 26e are installed in the cab.

The automatic cruise mode (constant velocity travelling), which is started when the operation switch 26a is turned on, is used particularly when travelling on an expressway and is a mode in which the own vehicle 20 is automatically traveled by the program stored in the control system 24 and operated as scheduled.

The automatic cruise mode is a mode where the control device 45 adjusts the operation of the engine 21 and the power transmission 22 to maintain the velocity V2 of the own vehicle 20 at a target velocity Va based on the map information acquired by the map information acquisition device 26d and the vehicle weight estimated by vehicle weight acquisition device 26e. Specifically, the automatic cruise mode is a mode where, by operating the engine 21 and the power transmission 22, the own vehicle 20 is automatically travelled while maintaining the velocity V 2 of the own vehicle 20 in a constant velocity range (Vb to Vc) between a lower limit value Vb (Va-x) and an upper limit value Vc (Va+y) set based on the target velocity Va.

The constant velocity range is a range between the lower limit value Vb and the upper limit value Vc set by the range setting switch 26c, based on the target velocity Va set by the velocity setting switch 26b. The driver can set the target velocity Va, the lower limit value Vb, and the upper limit value Vc to arbitrary values. For example, a case where the target velocity Va is set to 70 km/h or more and 90 km/h or less, the lower limit value Vb is set to the velocity of −10 km/h or more and 0 km/h or less with respect to the target velocity Va, and the upper limit value Vc is set to the velocity of 0 km/h or more and +10 km/h or less with respect to the target velocity Va is exemplified.

As the map information acquisition device 26d, a map information acquisition device using a satellite positioning system (GPS) can be exemplified, and the three-dimensional road data including the current position of the own vehicle 20 and the gradient and the traveling distance of the traveling route on which the own vehicle 20 is to travel is acquired. In addition to this, as the map information acquisition device 26d, a map information acquisition device which acquires the gradient and the traveling distance of the traveling route from the three-dimensional road data stored in a drive recorder can be exemplified. Further, the gradient may be calculated based on values acquired by the own vehicle velocity sensor 41 or the acceleration sensor (G sensor) 25e.

As the vehicle weight acquisition device 26e, a vehicle weight acquisition device which estimates the vehicle weight of the own vehicle 20 using the motion equation of the own vehicle 20 in the front-rear directions based on parameters (velocity and acceleration) which change during the travelling of the own vehicle 20 can be exemplified. In addition, as the vehicle weight acquisition device 26e, a vehicle weight acquisition device using a method based on the change in an up-down direction may be used when the own vehicle 20 is equipped with an air suspension and a vehicle weight acquisition device using a method based on the torque input to the transmission before and after the shift and the change amount of the rotation velocity output from the transmission may be used. In addition, a weight sensor such as a load cell may acquire a body weight based on change of loadage.

The adjacent vehicle 30 is a vehicle traveling preceding the own vehicle 20 in the same direction as the own vehicle 20 in the cruising lane 13 adjacent to the passing lane 12 on which the own vehicle 20 travels. In this case, "preceding" means that the rear end of the adjacent vehicle 30 precedes the front end of the own vehicle 20. That is, when a vehicle is present on a y-directional lateral side of the own vehicle 20, the vehicle is not included in the adjacent vehicle 30. Further, an adjacent following vehicle 31 is a vehicle travelling on the cruising lane 13 following the adjacent vehicle 30, and more specifically, a vehicle which has been overtaken by the own vehicle 20 or travels parallel to the own vehicle 20. A following vehicle 32 is a vehicle travelling following the own vehicle 20 on the passing lane 12.

In this embodiment, two sensors, the own vehicle velocity sensor 41 and the adjacent vehicle velocity sensor 42, are used as relative velocity acquisition devices for acquiring a relative velocity $\Delta V1$ of the adjacent vehicle 30 to the own vehicle 20. That is, the value obtained by subtracting the velocity V2 acquired by the own vehicle velocity sensor 41 from the velocity V3 acquired by the adjacent vehicle velocity sensor 42 becomes the relative velocity $\Delta V1$.

When the relative velocity $\Delta V1$ becomes negative, the velocity V3 is slower than the velocity V2 and the adjacent vehicle 30 approaches the own vehicle 20. When the relative velocity $\Delta V1$ is positive, the velocity V3 is faster than the velocity V2 and the adjacent vehicle 30 is away from the own vehicle 20. When the relative velocity $\Delta V1$ is zero, the distance between the adjacent vehicle 30 and the own vehicle 20 does not change substantially.

The own vehicle velocity sensor 41 is a sensor which reads a pulse signal proportional to the rotational speed of a propeller shaft and acquires the velocity V2 of the own vehicle 20 at each sampling cycle by vehicle speed calculation processing (not illustrated) of the control system 24. As a device that acquires the velocity V2 of the own vehicle 20, instead of the own vehicle velocity sensor 41, a sensor for acquiring the velocity V2 from the rotational speed of an output shaft (not illustrated) of the transmission, a drive wheel, a driven wheel, or the like may be used.

The adjacent vehicle velocity sensor 42 is a radar sensor and is a sensor which emits radio waves and receives the radio waves reflected by the adjacent vehicle 30, thereby detecting the position of the adjacent vehicle 30 and the velocity V3 of the adjacent vehicle 30. As a device that acquires the velocity V3 of the adjacent vehicle 30, instead of the adjacent vehicle velocity sensor 42, a device which accesses the control system of the adjacent vehicle 30 by wireless communication to acquire the velocity V3 may be used.

As the relative velocity acquisition device, it may be configured by only the adjacent vehicle velocity sensor 42 when the adjacent vehicle velocity sensor 42 which is a radar sensor can directly acquire the relative velocity $\Delta V1$. Also, as the relative velocity acquisition device, the relative velocity $\Delta V1$ may be acquired by analyzing the image using an imaging device which captures an image of the adjacent vehicle 30 and an analysis device which analyzes the image.

The indication device 43 is an indicator provided on a meter panel of the cab. The indication device 43 is constituted of a pair of right and left arrows. The indication device 43 is a device which indicates a driver to select a lane change by lighting or blinking one of the right and left arrows and indicates the driver to keep the lane by turning off both arrows.

A lane acquisition device 44 is an imaging device directed to the front of the own vehicle 20 and is a device that acquires the lane on which the own vehicle 20 travels by image-recognizing a white line 14 laid on the road 10. A lane departure warning device can be exemplified as the lane acquisition device 44. Also, as the lane acquisition device 44, the map information acquisition device 26d may be used instead.

The control device 45 is connected to the own vehicle velocity sensor 41, the adjacent vehicle velocity sensor 42, the indication device 43, and the lane acquisition device 44. The control device 45 is a hardware constituted of a CPU which performs various information processing, an internal storage device which can read and write programs used to perform the various information processing and information processing results, and various interfaces.

The control device 45 has a functional element which adjusts the velocity V2 of the own vehicle 20 based on the relative velocity $\Delta V1$ when the own vehicle 20 travels on the passing lane 12 in the auto cruise mode and a functional element which indicates the lane on which the own vehicle 20 travels.

Specifically, when the own vehicle 20 travels on the passing lane 12 and the adjacent vehicle 30 travels on the cruising lane 13, if the relative velocity $\Delta V1$ falls within a set range ($\Delta Va$ to $\Delta Vb$) set in advance, the control device 45 is configured to perform speed-up adjustment to increases the velocity V2 of the own vehicle 20 in the range up to the upper limit value Vc as the velocity adjustment. Further, when the own vehicle 20 overtakes the adjacent vehicle 30 after performing the speed-up adjustment, the control device 45 is configured to make the indication device 43 output indication to select the cruise lane 13 as the lane on which the own vehicle 20 travels and perform deceleration adjustment to reduce the velocity V2 of the own vehicle 20 to the target velocity Va as the velocity adjustment.

Next, a driving assist method of the present disclosure will be described as the function of the control device 45 with reference to a flow chart of FIG. 3. The driving assist method described below is started when a driver turns on the operation switch 26a and the own vehicle 20 travels in the automatic cruise mode and is repeatedly performed at predetermined intervals. Then, the driving assist method is completed when the automatic cruise mode is finished.

First, the control device 45 determines whether the own vehicle 20 travels on the passing lane 12 by the lane acquisition device 44 (S110). When it is determined that the own vehicle 20 travels on the passing lane 12, the control device 45 acquires the relative velocity $\Delta V1$ by the own vehicle velocity sensor 41 and the adjacent vehicle velocity sensor 42 (S120).

Next, the control device 45 determines whether the relative velocity $\Delta V1$ is less than a velocity difference $\Delta V2$ (S130). Assuming that the own vehicle 20 is increased to the upper limit value Vc, the velocity difference $\Delta V2$ is set to a predictable value that the assumed relative velocity with respect to the own vehicle 20 assumed by the adjacent vehicle 30 becomes negative. Specifically, the velocity difference $\Delta V2$ is a difference obtained by subtracting the current velocity V2 of the own vehicle 20 from the upper limit value Vc. When the relative velocity $\Delta V1$ is lower than the velocity difference $\Delta V2$, it is a case where it is possible to overtake the adjacent vehicle 30 by increasing the velocity V2 of the own vehicle 20 to the upper limit value Vc. When the relative velocity $\Delta V1$ is the velocity difference $\Delta V2$ or more, even if the velocity V2 of the own vehicle 20 is increased to the upper limit value Vc, it is not possible to overtake the adjacent vehicle 30.

Next, when it is determined that the relative velocity $\Delta V1$ falls below the velocity difference $\Delta V2$, the control device 45 determines whether the relative velocity $\Delta V1$ falls within the set range ($\Delta Va$ to $\Delta Vb$) (S140). The set range is set to a range where, assuming that the own vehicle 20 travels while maintaining the passing lane 12, it can be predicted that the period in which own vehicle 20 travels parallel to the adjacent vehicle 30 will be longer than a predetermined period. That is, the set range is set to a value capable of determining that the velocity V2 of the own vehicle 20 is close to the velocity V3 of the adjacent vehicle 30. As the set range, a region of zero or less is preferable, and for example, a range from −2 km/h to 0 km/h is exemplified. In a case where the relative velocity $\Delta V1$ falls within the set range, the period in which the own vehicle 20 travels parallel to the adjacent vehicle 30 is a long period of time. When the relative velocity $\Delta V1$ is out of the set range, the period of parallel travelling is a short period or there is no period of parallel traveling. In a step of S130, a case where the relative velocity $\Delta V1$ is less than the velocity difference $\Delta V2$ and the relative velocity $\Delta V1$ is out of the set range is a case where the velocity V2 of the own vehicle 20 is sufficiently faster than the velocity V3 of the adjacent vehicle 30 and the period of parallel travelling is short.

Next, when it is determined that the relative velocity $\Delta V1$ falls within the set range, the control device 45 performs speed-up adjustment to increase the velocity V2 of the own vehicle 20 in the range up to the upper limit value Vc (S150). Specifically, the control device 45 increases a velocity to the velocity obtained by adding a preset increase value Vd to the velocity V2 of the own vehicle 20. The increase value Vd is set to a value that can shorten the parallel travelling period of own vehicle 20 and the adjacent vehicle 30 within the range of velocity difference $\Delta V2$ or less.

Next, the control device 45 indicates a driver using the indication device 43 to select the passing lane 12 as the lane on which the own vehicle 20 travels (S160). Specifically, the control device 45 turns off the indicator of the indication device 43 and indicates a driver to keep the passing lane 12 without changing the lane.

On the other hand, when it is determined that the relative velocity $\Delta V1$ becomes equal to or greater than the velocity difference $\Delta V2$ or when it is determined that the relative velocity $\Delta V1$ is out of the set range, the control device 45 performs velocity adjustment where the velocity V2 of the own vehicle 20 is adjusted to the target velocity Va (S170). Specifically, when the velocity V2 of the own vehicle 20 is maintained at the target velocity Va, the control device 45 maintains it as it is. On the other hand, when the velocity V2 is faster than the target velocity Va, the control device 45 performs deceleration adjustment to slow the velocity V2 to the target velocity Va as the velocity adjustment. As the deceleration adjustment, the velocity adjustment where the engine 21 is stopped or becomes an idle state and the transmission of the power transmission 22 becomes a neutral state can be exemplified.

Next, the control device 45 determines whether the relative speed $\Delta V1$ is negative (S180). When the relative velocity $\Delta V1$ is negative, the velocity V3 of the adjacent vehicle 30 is slower than the velocity V2 of the own vehicle 20 and the inter-vehicle distance between the adjacent vehicle 30 and the own vehicle 20 gradually decreases. On the other hand, when the relative velocity $\Delta V1$ is zero, the velocity V3 is the same as the velocity V2 and the inter-vehicle distance between the adjacent vehicle 30 and the own vehicle 20 does not substantially change, and further when the relative velocity $\Delta V1$ is positive, the velocity V3 is faster than the velocity V2 and the inter-vehicle distance between the adjacent vehicle 30 and the own vehicle 20 gradually increases. That is, it may be determined whether the velocity V3 of the adjacent vehicle 30 becomes slower than the velocity V2 of the own vehicle 20 as to whether the relative velocity $\Delta V1$ becomes negative.

Next, when it is determined that the relative velocity $\Delta V1$ becomes negative, the control device 45 indicates a driver using the indication device 43 to select the passing lane 12 as the lane on which the own vehicle 20 travels (S160).

On the other hand, when it is determined that the relative velocity $\Delta V1$ becomes zero or positive, the control device 45 indicates a driver using the indication device 43 to select the cruising lane 13 as the lane on which the own vehicle 20 travels (S190). Specifically, the control device 45 turns on the left-pointing arrow of the indicators of the indication device 43 and issues an indication to change the lane from the passing lane 12 to the cruising lane 13.

As described above, when the own vehicle 20 travels in the automatic cruise mode, if the relative velocity $\Delta V1$ of the adjacent vehicle 30 to the own vehicle 20 falls within the set range ($\Delta Va$ to $\Delta Vb$), the own vehicle 20 can overtake the adjacent vehicle 30 more quickly by performing the speed-up adjustment which speeds up the velocity V2 of the own vehicle 20 to the upper limit value Vc. Therefore, as the parallel travelling period between the own vehicle 20 and the adjacent vehicle 30 is shortened, it becomes advantageous to reduce unnecessary acceleration for eliminating the inconvenience by parallel travelling, and thus unnecessary fuel consumption can be reduced. As a result, fuel consumption can be improved.

When the own vehicle 20 travels the passing lane 12 in the automatic cruise mode, if the driving assist method described above is performed, it is possible to avoid interfering with the fuel saving control in the automatic cruise mode. That is, fuel consumption can be improved by reducing unnecessary deceleration and reacceleration by a driver.

In particular, the driving assist method described above is suitable in a situation illustrated in FIGS. 1 to 3. In FIGS. 1 to 3, the following vehicle 32, the own vehicle 20, the adjacent vehicle 30, and the adjacent following vehicle 31 are in ascending order of speed and the following vehicle 32 is the fastest. FIGS. 1 and 3 illustrate the situation after the own vehicle 20 has changed a lane from the cruising lane 13 to the passing lane 12 and the own vehicle 20 overtakes the adjacent following vehicle 31 because the velocity V4 of the adjacent following vehicle 31 is slow. Also, it is assumed that the own vehicle 20 travels in the automatic cruise mode.

For example, as illustrated in FIG. 1, it is suitable when the following vehicle 32 approaches to the own vehicle 20, in a situation where the inter-vehicle distance between the adjacent vehicle 30 and the adjacent following vehicle 31 is short and the own vehicle 20 cannot change a lane to the cruising lane 13 immediately after the own vehicle 20 overtakes the adjacent following vehicle 31. In this case, a driver depresses the accelerator pedal and accelerates the own vehicle 20 so as to overtake the adjacent vehicle 30. Therefore, unnecessary acceleration will occur and the automatic cruise mode will also be released.

On the other hand, according to the driving assist system 40, when the relative velocity $\Delta V1$ of the adjacent vehicle 30 to the own vehicle 20 falls within the set range, by indicating the selection of the passing lane 12 using the indication device 43 and increasing the velocity V2 of the own vehicle 20, it is possible to quickly overtake the adjacent vehicle 30. This shortens the period of time when the own vehicle 20 and the adjacent vehicle 30 travel parallel, which is advantageous for suppressing inadvertent acceleration by a driver. In addition, the automatic cruise mode is also continued, which is advantageous for improving the fuel consumption.

Further, as illustrated in FIG. 2, after speeding up the velocity V2 of the own vehicle 20 and overtaking the adjacent vehicle 30, the indication device 43 indicates to select the cruising lane 13 and the velocity V2 of the own vehicle 20 is reduced to the target velocity Va. In particular, when the velocity V2 of the own vehicle 20 is reduced to the target velocity Va, it is preferable to stop or idle the engine 21 and put the transmission of the power transmission 22 in a neutral state. By reducing the velocity V2 as described above, it is advantageous to eliminate the deterioration in fuel consumption for the amount spent for overtaking the adjacent vehicle 30.

Further, as soon as the own vehicle 20 overtakes the adjacent vehicle 30, without changing the lane to the cruising lane 13, the control similar as described above may be performed based on the relative velocity of a vehicle travelling ahead of the adjacent vehicle 30 to the own vehicle 20.

Further, as illustrated in FIG. 3, when the relative velocity ΔV1 is out of the set range and the relative velocity ΔV1 is the velocity difference ΔV2 or more, the inter-vehicle distance between the adjacent vehicle 30 and the adjacent following vehicle 31 increases. In this case, when the own vehicle 20 tries to overtake the adjacent vehicle 30, the velocity V2 of the own vehicle 20 must be made faster than the upper limit value Vc. On the other hand, according to the driving assist system 40, when the relative velocity ΔV1 is out of the set range and the relative velocity ΔV1 is the velocity difference ΔV2 or more, the own vehicle 20 can change the lane and travel on the cruising lane 13 to follow the adjacent vehicle 30 by indicating the own vehicle 20 to select the cruising lane 13 as the lane on which the own vehicle 20 travels using the indication device 43. As a result, it is possible to suppress an inadvertent acceleration and continue the automatic cruise mode.

Further, when the vehicle V3 of the adjacent vehicle 30 slows down after the own vehicle 20 follows the adjacent vehicle 30, the control similar as described above is performed based on the relative velocity of the preceding vehicle to the own vehicle 20 rather than changing the lane from cruising lane 13 to the passing lane 12 and overtaking the adjacent vehicle 30.

Thus, by performing the velocity adjustment while traveling on the passing lane 12 in the automatic cruise mode, that is, by performing the velocity adjustment for eliminating the parallel travelling state as quick as possible, it is advantageous to reduce unnecessary deceleration and reacceleration of the own vehicle 20.

In the embodiment described above, an example is described which indicates a driver to select either the passing lane 12 or the cruising lane 13 based on the relative velocity ΔV1 as the lane on which the own vehicle 20 should travel. This selection indication may be output directed to the control system 24. That is, an indication to select from the control device 43 may be transmitted as an electrical signal to the control system 24 from the control device 45 and the control system 24 may be configured to perform control to maintain the passing lane 12 or control to change the lane to cruising lane 13.

Further, as the indication to be selected, in addition to an indication to appeal to the eye by an indicator or the like, an indication to appeal to the sense of hearing such as a voice indication or a warning sound or an indication to appeal to the sense of touch such as vibration can be exemplified.

This application is based on Japanese Patent Application No. 2016-221683 filed on Nov. 14, 2016, the contents of which are incorporated herein by reference.

INDUSTRIAL APPLICABILITY

According to the present disclosure, a parallel travelling period of the own vehicle and the adjacent vehicle is reduced, which is advantageous for reducing unnecessary acceleration by a driver and can reduce unnecessary fuel consumption.

REFERENCE SIGNS LIST 10 road
11 one side
12 passing lane
13 cruising lane
20 own vehicle
30 adjacent vehicle
40 driving assist system
41 own vehicle velocity sensor
42 adjacent vehicle velocity sensor
43 indication device
45 control device
ΔV1 relative velocity
Va target velocity
Vb to Vc constant velocity range
ΔVa to ΔVb set range

The invention claimed is:

1. A driving assist system which is installed in an own vehicle and supports velocity adjustment of the own vehicle when the own vehicle travels on a road provided with two or more lanes including a cruising lane and a passing lane on one side, comprising:
 a relative velocity sensor that acquires a relative velocity of an adjacent vehicle, which travels in a same direction as the own vehicle and is ahead of the own vehicle on an adjacent lane adjacent to a traveling lane, on which the own vehicle travels and which is one of the two or more lanes, with respect to the own vehicle;
 an indicator which indicates a lane on which the own vehicle is to travel; and
 a central processing unit (CPU) that is connected to the relative velocity sensor and the indicator and adjusts velocity of the own vehicle, wherein
 the CPU controls the velocity of the own vehicle to fall within a constant velocity range between a lower limit value and an upper limit value set based on a predetermined target velocity, and
 when the own vehicle travels on the passing lane and the adjacent vehicle travels on the cruising lane,
  if the relative velocity acquired by the relative velocity sensor falls within a predetermined range and the relative velocity is lower than a velocity difference that is a difference obtained by subtracting a current velocity of the own vehicle from the upper limit value, the CPU performs speed-up adjustment to increase the velocity of the own vehicle up to the upper limit value of the constant velocity range and the indicator performs indication of selecting the passing lane as a lane on which the own vehicle is to travel, and
  if the relative velocity does not fall within the predetermined range or the relative velocity is equal to or higher than the velocity difference, the CPU performs velocity adjustment where the current velocity of the own vehicle is adjusted to the predetermined target velocity and
   when the relative velocity becomes negative, the indicator indicates that the passing lane is selected as a lane on which the own vehicle is to travel, and
   when the relative velocity becomes zero or positive, the indicator indicates to select the cruising lane as a lane on which the own vehicle is to travel.

2. The driving assist system according to claim 1, wherein the predetermined range is set to a predictable range where, in a case where the own vehicle travels in the passing lane, a period for which the own vehicle travels parallel to the adjacent vehicle is longer than a predetermined period.

3. The driving assist system according to claim 1, wherein when the own vehicle overtakes the adjacent vehicle after performing the speed-up adjustment, the CPU issues an indication to select the cruising lane as a lane on which the own vehicle travels using the indicator and performs deceleration adjustment to slow the velocity of the own vehicle to the predetermined target velocity as the velocity adjustment.

4. The driving assist system according to claim 1, wherein the CPU prohibits the velocity adjustment when the relative velocity is out of the predetermined range.

5. A driving assist method which supports velocity adjustment of an own vehicle, comprising:
- when, on a road provided with two or more lanes including a cruising lane and a passing lane on one side, the own vehicle travels on the passing lane within a constant velocity range between a lower limit value and an upper limit value set based on a predetermined target velocity and an adjacent vehicle travelling in a same direction as the own vehicle and is ahead of the own vehicle travels on the cruising lane,
- acquiring a relative velocity of the adjacent vehicle with respect to the own vehicle;
- determining whether the acquired relative velocity falls within a predetermined range and whether the relative velocity is lower than a velocity difference that is a difference obtained by subtracting a current velocity of the own vehicle from the upper limit value; and
- performing, when the acquired relative velocity falls within the predetermined range and is lower than the velocity difference, velocity adjustment where a velocity of the own vehicle is increased to the upper limit value of the constant velocity range and indication of selecting the passing lane as a lane on which the own vehicle is to travel (S160)
- performing, if the relative velocity does not fall within the predetermined range or the relative velocity is equal to or higher than the velocity difference, velocity adjustment where the current velocity of the own vehicle is adjusted to the predetermined target velocity and
- performing, when the relative velocity becomes negative, indication of selecting the passing lane as a lane on which the own vehicle is to travel, and
- performing, when the relative velocity becomes zero or positive, indication of selecting the cruising lane as a lane on which the own vehicle is to travel.

* * * * *